Nov. 9, 1965 J. Z. JACOBY 3,217,108

SIGNALING CIRCUITRY COUPLING TELEPHONE CENTRAL OFFICE AND REMOTE SWITCHING UNIT

Filed Dec. 26, 1961 5 Sheets-Sheet 1

INVENTOR
J. Z. JACOBY
BY
SEHollander
ATTORNEY

Nov. 9, 1965 J. Z. JACOBY 3,217,108

SIGNALING CIRCUITRY COUPLING TELEPHONE CENTRAL OFFICE AND REMOTE SWITCHING UNIT

Filed Dec. 26, 1961 5 Sheets-Sheet 2

INVENTOR
J. Z. JACOBY
BY
S E Hollander
ATTORNEY

INVENTOR
J. Z. JACOBY
BY
S E Hollander
ATTORNEY

Nov. 9, 1965 J. Z. JACOBY 3,217,108

SIGNALING CIRCUITRY COUPLING TELEPHONE CENTRAL OFFICE AND REMOTE SWITCHING UNIT

Filed Dec. 26, 1961 5 Sheets-Sheet 4

INVENTOR
J. Z. JACOBY
BY
S E Hollander
ATTORNEY

Nov. 9, 1965 J. Z. JACOBY 3,217,108

SIGNALING CIRCUITRY COUPLING TELEPHONE CENTRAL OFFICE AND REMOTE SWITCHING UNIT

Filed Dec. 26, 1961 5 Sheets-Sheet 5

INVENTOR
J. Z. JACOBY
BY
S E Hollander
ATTORNEY

United States Patent Office 3,217,108

Patented Nov. 9, 1965

3,217,108

SIGNALING CIRCUITRY COUPLING TELEPHONE CENTRAL OFFICE AND REMOTE SWITCHING UNIT

John Z. Jacoby, Murray Hill, N.J., assignor to Bell Telephone Laboratories, Incorporated, New York, N.Y., a corporation of New York Filed Dec. 26, 1961, Ser. No. 162,167
15 Claims. (Cl. 179—18)

This invention relates to telephone signaling circuits and more particularly to signaling arrangements for use in transmitting supervisory conditions from a remote switching unit to a telephone central office in a distributed telephone switching system.

A continuing problem in telephone switching technology is the servicing of groups of subscribers located at a substantial distance from existing telephone central offices. In part, this problem arises as a result of the continuing pattern of suburbanization in which residential developments are built at distances approaching perhaps twenty-five miles from previous established residential areas. The latter often are of high population density and may be economically served by conventional telephone central office equipment. With regard to the suburban subscribers, however, the distances between the central office and the substation locations are sufficient to preclude the economic feasibility of extending a separate line from each subscriber to the central office as in conventional practice.

An arrangement for attacking this problem as disclosed in an application of C. Abert, Serial No. 162,163, filed on even date herewith, is by divorcing a portion of the switching equipment normally located within the confines of the telephone office and removing the same to a distant location contiguous to the suburban subscribers.

As indicated in the above-referred-to-application, this type of "distributed" switching equipment operates most favorably when the circuitry in the office and the circuitry in the remote unit are designed to cooperate in a manner which would indicate to neither that a substantial distance separates the two. Instead, the communication circuitry therebetween is arranged to simulate to the remote unit and to the central office that they are, in effect, conventionally interconnected.

As explained in detail in the above-referred-to application of Abert, the distributed type of switching system found its origin as a result of the inefficiencies occasioned in the prior servicing of suburban communities. As is well known, the rapid growth of "development" type communities has placed an unprecedented burden on existing central office equipment. In practice these communities have radiated from prior "central" suburban villages or towns in all directions. In the past this challenge was met on an individual basis as each development arose by supplying concentrator-type facilities to service the group of houses in the development. The reason for supplying concentrators is obvious, viz., to literally "concentrate" a larger number of the subscriber lines at a centralized remote location and to extend these lines over a lesser number of trunks to the office—thereby obtaining a marked economy in the copper savings over that required to supply a direct connection to each substation line from the office. In brief, certain prior procedures in servicing remote groups of subscribers were predicated on piecemeal installation of individual concentrator units.

Historically, also as is well known, the individual development-type communities continued to expand until their boundaries merged to form entirely new villages and towns at substantial distances from the prior "older" villages. At this point the inefficiency which inheres in the concentrator-type approach becomes most pronounced. The relatively high concentration of subscribers in the new town would reasonably and economically support a local modern telephone central office. But since the concentrator units previously in service are often of the universal type (one in which modification of the central office is unnecessary), the units were substantially engrafted on the prior existing remote central office.

In order to service these lines, as practicality dictates, from a newly installed local telephone central office in the new community, the connections to the concentrator units and the concentrator units themselves must be removed—a manifestly costly procedure in labor and equipment. This difficulty is compounded in view of the additional expense of then reconnecting the subscribers to the new local telephone central office.

The procedure described in the application of Abert, filed on even date herewith, proposes to remedy this difficulty by, in the case of a No. 5 crossbar central office, removing the conventional line link frame from its usual location in the office and disposing it perhaps fifteen miles distant therefrom in the proximity of the development or remote community. The subscribers are connected to the remote line link frame in the same manner in which local subscribers are connected to the conventional line link frame in the office. The remote line link frame and the office are coupled over speech and control paths in a manner which simulates to each that a direct connection exists, rather than a fifteen mile separation.

Since the remote line link frame is by intention a conventional unit, this equipment may serve as a nucleus or core around which to build the remainder of the central office when future growth dictates this event.

Thus, as the number of developments in the remote community increase and begin to coalesce and at that time at which the installation of a central office to serve these subscribers is economically feasible, the remaining switching and common control equipment may be disposed at the same remote location and connected to the already intact and wired remote line link frame.

This completely eliminates the temporary or short-term expedient type of solution described for line concentrator usage and the economic waste which results when the concentrators must be abandoned in favor of a local telephone central office.

One of the essential criteria that must be observed in providing a signaling arrangement for a distributed type of switching system is the desirability of modifying to as minimal an extent as possible the central office equipment and the remote equipment. In consequence, the burden imposed on the bidirectional type of signaling system adverted to above is considerable. This results since the sleeve conditions which may conceivably be applied to the line during various types of common control operations including originating calls, terminating calls, etc., are such that the impedance of the reference potential connected to the sleeve conductor may vary by a factor of two or more. These variations, when taken in conjunction with other transient and noise phenomena occurring over the fifteen to twenty-five mile junctor length, demand circuitry of unusual reliability. In addition, the necessary compatibility between the remote unit and central office is rendered correspondingly difficult to obtain with a single fixed impedance bidirectional relay system.

It is therefore an object of this invention to provide bidirectional signaling between distant locations wherein the source impedance of the signaling element at each location may vary.

As indicated in the Abert application, the distributed switching arrangement is predicated, in part, on the introduction into the remote community of a conventional type of line link frame compatible with the remainder of the No. 5 crossbar telephone equipment later to be installed.

As indicated above, the remote disposition of the line link frame to which the subscriber lines are connected carries significant advantages. However, the isolation of the line link frame in the remote unit from its usual direct metallic connection to the trunk link frame which exists when both are situated physically in the same office, introduces a number of problems with regard to communication between the line link frame and trunk link frame.

Among these difficulties occasioned by the remote disposition of the line link frame and its divorcement from its traditional bond to the trunk link frame are those which arise when ordinarily routine signaling functions are required. Thus, the repetition of dialing signals from the substation over the line link frame must now be carried over an extended junctor circuit of perhaps fifteen miles or more. In addition, ringing facilities must be provided at the remote unit and information with regard thereto available at the central office.

It is therefore an object of this invention to provide for repetition of dial pulsing from the remote unit to the central office.

An additional object of this invention is to provide for the control of ringing functions at the remote unit from the central office.

As indicated in the above-referred-to application, the communication between the remote switching unit and the central office are of two general types. A first category includes transmission of control information relating to supervisory indications of various conductors at the remote switching unit and the central office to each other. In this sense, the effort has been to simulate to the remote unit and the central office that an electrical connection is in effect directly therebetween. The second general category of communication includes the extension of the actual speech paths or junctors between the remote unit and the central office. It has been determined, however, that considerable advantages accrue in performing a number of signaling functions ordinarily in the first category over those channels generally utilized in the second category for speech transmission.

It is therefore an object of this invention to provide for the transmission of supervisory control signals between the remote units and the central office over the extended junctor paths.

Perhaps one of the most stringent requirements for communication between the remote unit and the central office is the necessity for transmitting sleeve supervisory potential conditions. In a terminating call the central office common equipment conventionally places a ground potential on the sleeve of the called line. Since, by definition, the called line is no longer connected to the central office but is instead termniated at the remote unit, it is necessary to transmit this ground indication to the remote unit. A corresponding problem exists when it is necessary to transmit supervisory sleeve information from the remote unit to the central office.

In the past, arrangements for transmitting bidirectional supervisory indications have, as is well known, been extensively exploited but the problem encountered has been different in kind since in most applications the interconnecting channel between the distant units has been continuous or metallic.

As an example, in prior arrangements using bidirectional relay signaling between location A and location B, it was desirable to energize the relay at location B when transmitting in a direction from A to B, allowing the relay at A, or local relay, to remain passive. Correspondingly, when transmitting from B to A, the local relay B was allowed to remain passive and the distant relay at A activated. The usefulness of this type of arrangement, in which the local relay is passive and the distant relay is activated, is apparent when it is considered that the transmitting station ought not to activate its local relay since such activation is ordinarily attributable to signaling from the distant unit.

It is equally apparent that this type of operation is inadequate for the present purpose. This is demonstrated when it is recognized that the remote unit and central office are no longer metallically interconnected. Instead as described in the application of Abert, information regarding the sleeve condition at the central office together with numerous other supervisory indications are combined over a shared channel between a data system transmitter at the central office and receiver at the remote circuit. A similar channel exists in the opposite direction and funnels the required control intelligence from the remote unit over a common or shared channel between a data transmitter at the remote unit and a data receiver at the central office.

Returning to the inability of certain prior relay signaling arrangements to operate compatibly in this context, it is seen that for a sleeve ground condition at the central office representing a terminating call, for example, the allowance of the local sleeve signaling relay at the central office to remain passive may result in loss of the information since the local relay fails to operate and as a result no information is supplied to the data transmission system. Since no information is supplied, the distant unit is, of course, unable to perceive the change in supervisory condition at the opposite end.

Instead, it is necessary in order to apprise the data transmission system of the change in supervisory conditions of the sleeve terminal by operating the relay at the originating end of the channel rather than allowing it to remain passive. Correspondingly at the remote end, the relay is now allowed to remain passive while at the same time transmitting the appropriate supervisory potential to the sleeve conductor connected thereto.

It is therefore an object of this invention to provide bidirectional relay signaling arrangements in which the originating relay is responsive to changes in supervisory potential and the distant corresponding relay is passive while, nevertheless, transmitting the appropriate supervisory indication.

These and other objects and features of the invention may be achieved in an illustrative embodiment in which a number of conventional No. 5 crossbar line link frames are disposed in an area contiguous to the subscribers to be connected thereto. The particular location selected may be perhaps twenty-five miles from the No. 5 crossbar "master" office itself. Each of the lines to be served by the remote unit is terminated at the No. 5 crossbar line link frame in the conventional manner on the vertical conductive paths as described in detail in Patent 2,585,904 of February 19, 1952, to A. J. Busch. In addition, a trunk link frame which will illustratively include intraunit trunks to provide interaunit switching connection paths is also included at the remote location. These trunk link frames are also of the type described in the above-referred-to patent. The over-all arrangement of the line link frames and trunk link frames at the remote unit are such that with respect to the central office the remote unit is "unaware" that the various control connections emanating from the line link and trunk link frames do not extend directly to the central office. This arrangement is intentional in order to provide for the future disposition of common equipment at the remote unit when economically justifiable without the necessity of major structural innovations at the remote unit.

The connections between the remote unit and the master No. 5 crossbar office are of two general categories. In the first group are included the control connections ordinarily extending between the line link frames, trunk link frames, and the common equipment in the office. The second group includes the extension of the speech paths or junctors between the remote unit and the central office.

Since it would be uneconomical to provide a line for line connection for all of the control conductors over the relatively lengthy distance to the office, the control communication is by way of a data transmission system which may be of any suitable type, for example that shown in an application of J. Z. Jacoby, Serial No. 139,174, filed September 19, 1961.

The speech paths or second group are coupled to the office over literally "extended" junctor circuits which include the necessary conventional repeater amplifiers to transmit speech and other information from the remote unit to the central office.

Each substation connected to the remote line link frame is serviced by common control equipment at the No. 5 crossbar office over the data transmission system. Transmission connections are made over the extended junctor circuits. The general operation of the system, with the exceptions indicated, parallels in large measure (and intentionally) the conventional operation of the No. 5 crossbar system explained in detail in the above-referred-to Busch patent.

Thus, in servicing an originating call at a line connected to a remote switching unit, the off-hook condition results in the operation of the conventional line relay in the remote line link frame which in turn apprises a line link marker connector in the central office over the data transmission system that a marker is required. The line link marker connector seizes an idle marker over the data transmission system and transmits to the marker the identity of the calling line.

The marker then proceeds in a conventional manner to establish a dialing connection between the subscriber line and an idle originating register. In doing so the marker ascertains the calling line link frame number and the equipment number of the calling line on the frame. In addition, the marker determines the availability of an idle register and the number of the trunk link frame on which the idle register appears. Thereafter, the marker establishes that an idle channel (including an extended junctor) between the remote line and the register is available. The calling line class of service and equipment location is stored in the originating register by the marker.

The marker then proceeds to select an idle channel between the subscriber line and the originating register. In the present embodiment, the channel consists of a line link, an extended junctor and a trunk link. After the availability of the channel is established, the marker operates the appropriate select and hold magnets in the central office and in the remote unit to close through the channel. The register supplies dial tone to the substation and is prepared to receive the digits which are dialed.

The subscriber may now proceed to dial the called directory number. For purposes of illustration it will be assumed that the called directory number represents a number of a substation connected to the same remote unit as the calling subscriber.

After registration of the called directory number in the originating register, the information therein contained is delivered to a selected marker. Conventional equipment in the marker is then utilized to examine the first three or office code digits to determine the routing of the call. The result of this translating procedure is to place a marking potential on a particular code point in an array of code points, each representative of different routing treatments. Since it has been assumed that an intraunit call is in effect, the marker proceeds to establish a connection over the intraunit trunk located in the remote unit. In doing so, it operates the appropriate select magnets and vertical magnets to establish a terminating connection between the called line and the "B" appearance of the intraunit trunk, and subsequently the originating connection is set up between the calling line and the "A" appearance of the intraunit trunk.

As in the case of intraoffice calls, the terminating connection is established after the marker has obtained the equipment location of a called number from the number group circuit and the appropriate ringing to be employed.

In establishing the originating connection between the calling line and the "A" appearance of the trunk, the marker seizes the line link frame of the calling substation over the data control system.

After the marker energizes the ringing selection switch in the appropriate manner, it releases itself. The subscribers are now interconnected over the intraunit trunk. Ringing is tripped when the called party answers. When the conversation is completed, the connections are released in a conventional manner, but autonomously at the remote unit rather than under control of the office.

It has been implicit throughout the above description that although the remote line link frame and trunk link frame are isolated at a considerable distance from the central office, control signals therebetween must be transmitted as though direct electrical connections obtained between both ends. It is the function of the data transmission equipment or signaling system therefore to bridge the gap between the remote switching unit and the central office in a manner which makes it appear to the central office that the line link frame is directly connected thereto rather than divorced therefrom by a data transmission system.

Thus, in consequence of the interconnection of the calling and called parties for a nonintraunit call, ground potential conditions are applied to the sleeve terminal of the calling or called party at the remote unit as well as the junctor sleeve at the central office. In each instance the sleeve condition is transmitted over an extended junctor circuit through a differentially wound relay signaling circuit and a data transmission system, as explained herein in detail. As a result of the application of ground potential to the sleeve conductor in the central office, the local differentially wound signaling relay in the central office is operated and in turn delivers an indication of this operation to the data transmission system which forwards the information to the corresponding differentially wound signaling relay at the remote unit without operating the latter relay.

As indicated above, the line link frame in the central office is connetced over junctor circuits to various trunk link frames, all as disclosed in detail in Patent 2,585,904 of February 19, 1952, to A. J. Busch, which is herewith incorpoarted by reference. The trunk link frames extend to originating registers, incoming trunks, outgoing trunks, etc.

Arrangements are made, as disclosed herein in detail, for "stretching" these junctor circuits between the line link frame at the remote unit and the central office. This necessitates the transmission of certain control information over the extended junctor circuit including, as explained herein, dial pulsing, repeating of tip party ground, ringing control, and repeating of ringback. In essence, it will be appreciated that the purpose of the extended junctor circuits and also the purpose of the data transmission system is to simulate a direct connection between the line link frame at the remote unit and the central office even though none exists.

The above and other objects and features of the invention may be more readily comprehended from an examination of the following specification, appended claims, and attached drawing, in which:

Figures 2, 6:
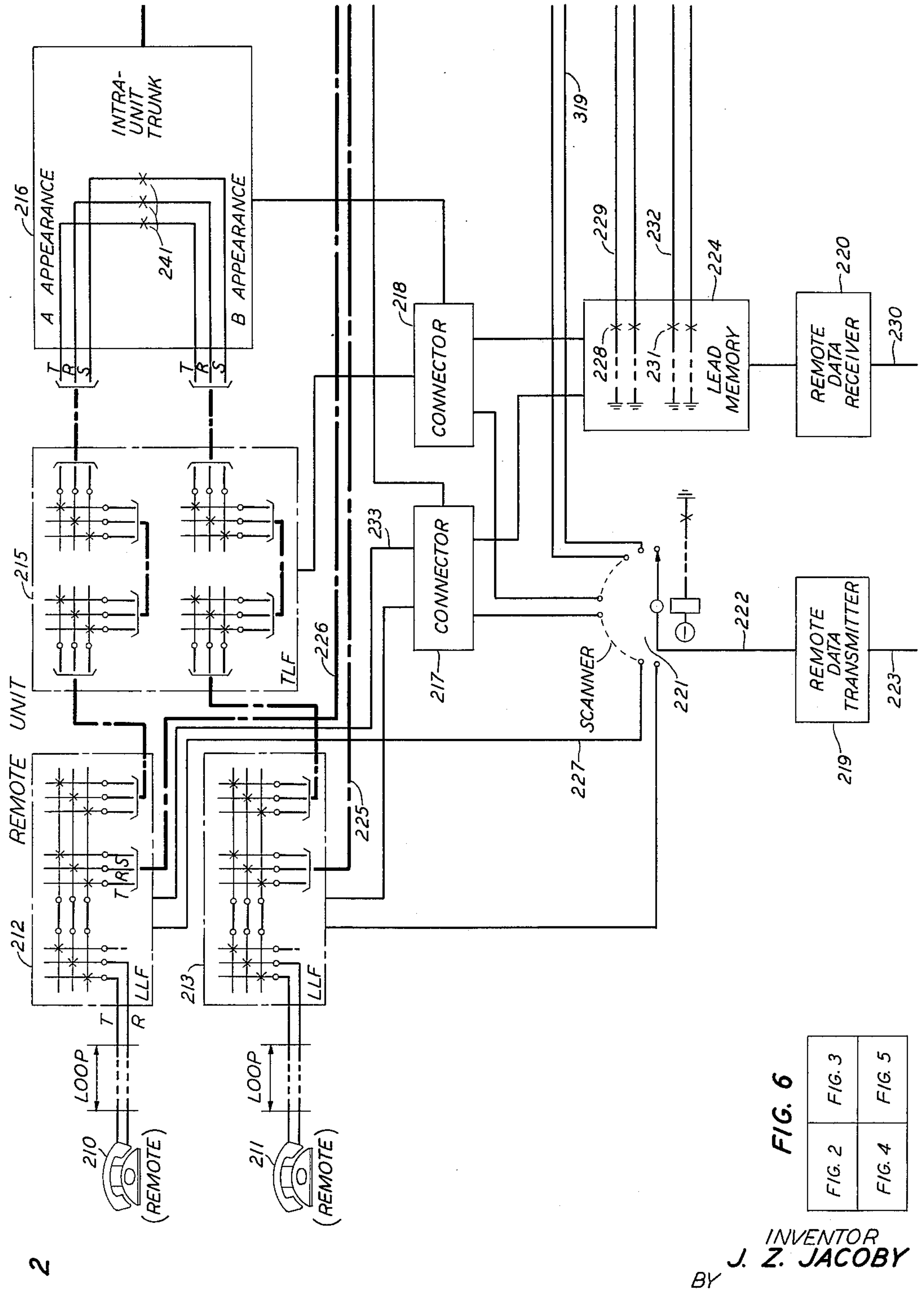
FIGS. 2 and 3 show the remote unit equipment including the line link frames, trunk link frame and the remote extended junctor circuitry.
Figure 5:
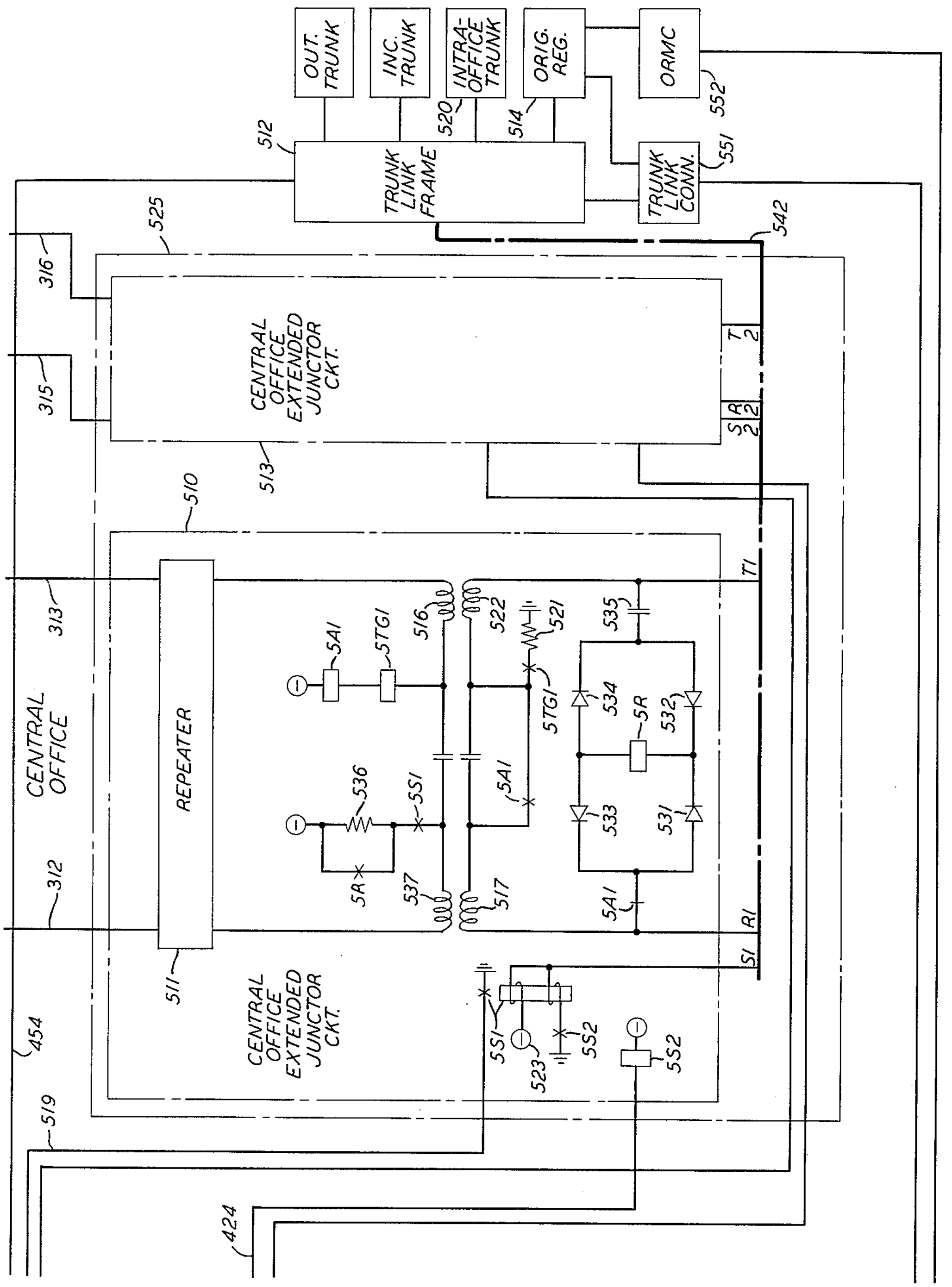

FIG. 5 includes the central office portion of the extended junctor circuitry;

FIG. 6 shows the appropriate interrelationship of FIGS. 2–5; and

Figures 3, 7:
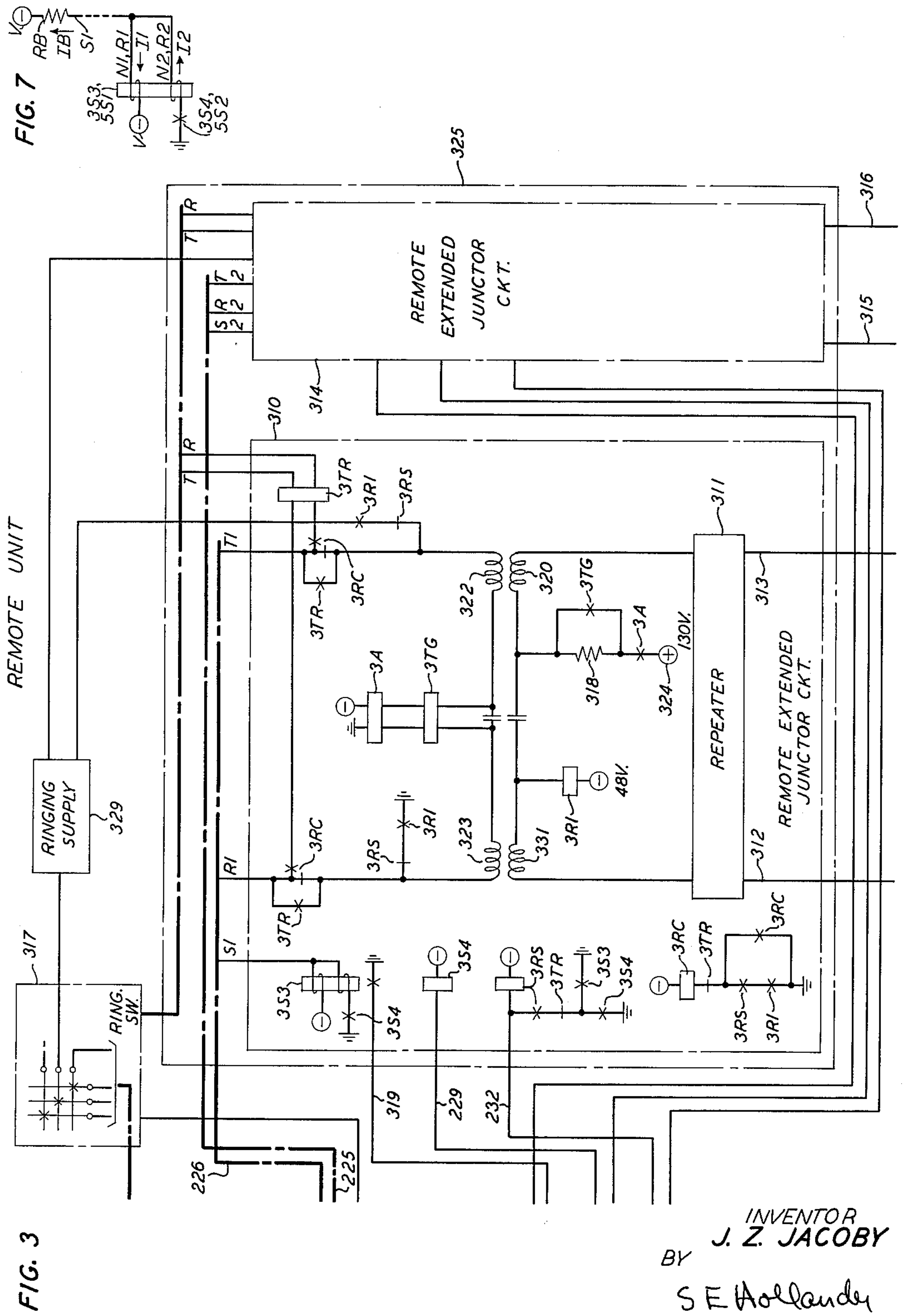

FIG. 7 is a schematic view of relays 3S3 and 5S1 and the voltages connectable thereto.

GENERAL DESCRIPTION

Figure 1:
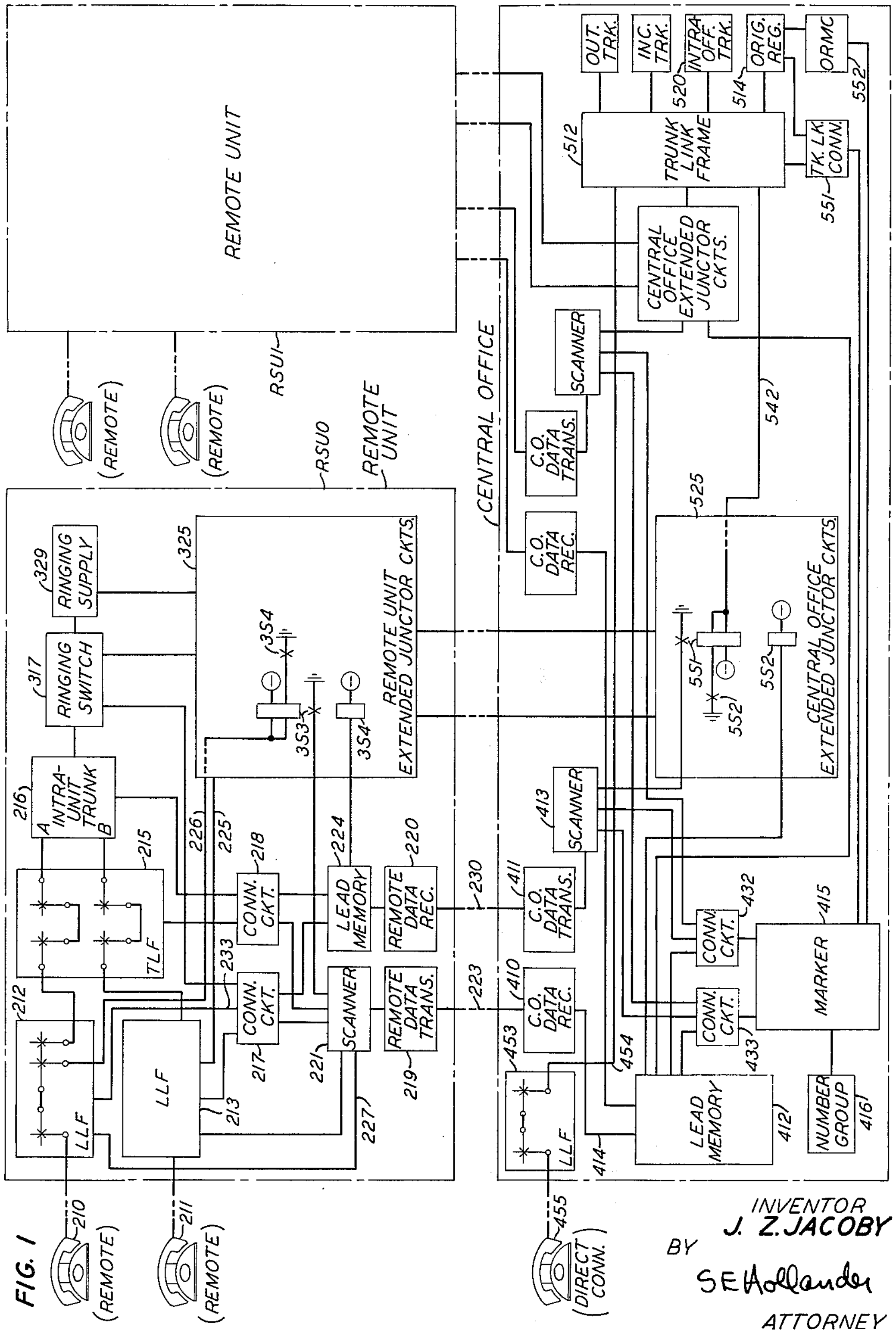
FIG. 1 shows an outline diagram of one specific illustrative embodiment of the invention in combination with a No. 5 crossbar telephone switching system.

FIG. 1 shows in general outline the remote units RSU0 and RSU1 of which only unit RSU0 is shown comprehensively. Where appropriate the equipments shown in outline form in the remote unit RSU0 and the central office bear the same reference designations which appear in the detailed FIGS. 2–5. It will be noted that only those elements essential to an understanding of the present invention are shown. Reference may be made to the above-referred-to Busch patent for a detailed description of the No. 5 crossbar system.

For illustrative purposes it will be assumed that remote substation 210 is initiating an intraunit call to remote substation 211. When substation 210 goes off hook, an indication thereof is transmitted from line link frame 212 to a terminal on scanner 221. In its periodic examination of all of the conductors connected thereto, scanner 221 detects the energized condition of line link frame 212 over conductor 227 and delivers an indication thereof to remote data transmitter 219 which in turn is coupled to receiver 410 at the central office. The information thus received at a relatively high rate of speed, as explained herein, is stored in a buffer circuit or lead memory 412 which latter stores the information on a semipermanent basis and in turn energizes conductors in the central office which correspond to the identical conductors which would have been energized if line link frame 212 were, in fact, situated in the office and directly connectable to the common equipment.

In a conventional manner, a marker 415 is selected and information representative of the calling number is delivered thereto. The marker after comparing information with the unit, in turn, prepares to establish a connection from the calling line to an originating register, for example register 514. The necessary information is transmitted from the marker and over the data transmission system via scanner 413 to the remote unit to establish the channel between calling substation 210 and originating register 514. Ultimately, when the appropriate horizontal and vertical magnets in the crossbar switches are operated, a circuit will extend from substation 210 through line link frame 212 over conductor 226 to the remote portion of the extended junctor circuit 310. The circuit may be further traced over the extended junctors to the central office portion of the extended junctor circuit 510 and thereafter over cable 542 to trunk link frame 512 and originating register 514. In this manner the subscriber is connected to the originating register which furnishes dial tone in the conventional manner and is prepared to receive the dialed digits.

It will be noted that connectors 217, 218, 432, 433, 551 and 552 are instrumental during control operations in providing access by the marker to other circuitry as explained in detail herein and in the Busch patent.

The transmission of the dialed digits over the extended junctor circuit includes the operation of relays 3A and 5A1 in junctor circuit 310 and 510, not shown in FIG. 1 but shown in detail in FIGS. 3 and 5 which serve to repeat the dial pulses generated by the calling substation to the originating register 514 at the central office in a manner analogous to that which would obtain if the calling substation were directly connected to the office.

In addition to the function of dial pulse repetition, other essential control and supervisory indications are transferred over junctors 310 and 510 of FIG. 1. Thus, for example, the repeating of tip party ground for party identification is conveyed over the extended junctor circuits rather than the data transmission system. Moreover, ringing control signals are similarly transferred.

A critical aspect of the extended junctor circuitry includes the facilities for transfer of sleeve supervisory indications. This equipment is shown as a bidirectional relay signal system including relays 5S1 and 5S2 at the central office and 3S3 and 3S4 at the remote unit. These relays are designed to provide a bidirectional transmission of supervisory information in a manner which permits the local relay to operate and the distant relay to remain passive though, nevertheless, transferring the appropriate indication.

Thus, for example, an indication representative of a sleeve ground condition at the central office results in the application of a ground condition to the junction of the windings of relay 5S1 in the central office extended junctor circuit over conductor 542. As shown in detail in FIG. 5, the two windings of relay 5S1 are differentially wound and as a result the application of a ground potential causes the operation of relay 5S1. This results in a ground condition applied over the contacts of relay 5S1 over conductor 519 to scanner 413 which in turn delivers the information to the data transmitter 411. Ultimately this indication is received in data receiver 220 and transferred to lead memory 224 which, as explained in detail herein, applies a ground condition to operate relay 3S4. The operation of relay 3S4 closes contacts to the lower winding of relay 3S3 and, also as will be shown in detail herein, the junction of the two windings of relay 3S3 assumes a potential approaching ground although relay 3S3 itself does not operate. This ground condition may be further traced over the sleeve conductor of junctor 226 to the line link frame 212.

In short, the application of a sleeve ground potential in the trunk link frame 512 results in the application of a ground to the corresponding sleeve conductor in line link frame 212 which may be at a distance of perhaps fifteen to twenty-five miles. A similar analysis may be made for signaling transfer in the direction from the remote unit to the central office in which event relay 3S3 is operated and relay 5S1 remains passive while, nevertheless, transferring a ground condition to the junction of the two windings of relay 5S1.

Returning to the reception of the called substation digits, originating register 514 stores digits corresponding to the directory number of called substation 211. After the necessary information is stored, originating register 514 engages marker circuit 415 in the conventional manner over originating register marker connector 552 and transmits the required information to the marker.

Marker 415 now proceeds to effect a connection between the calling and called substations.

Figure 4:
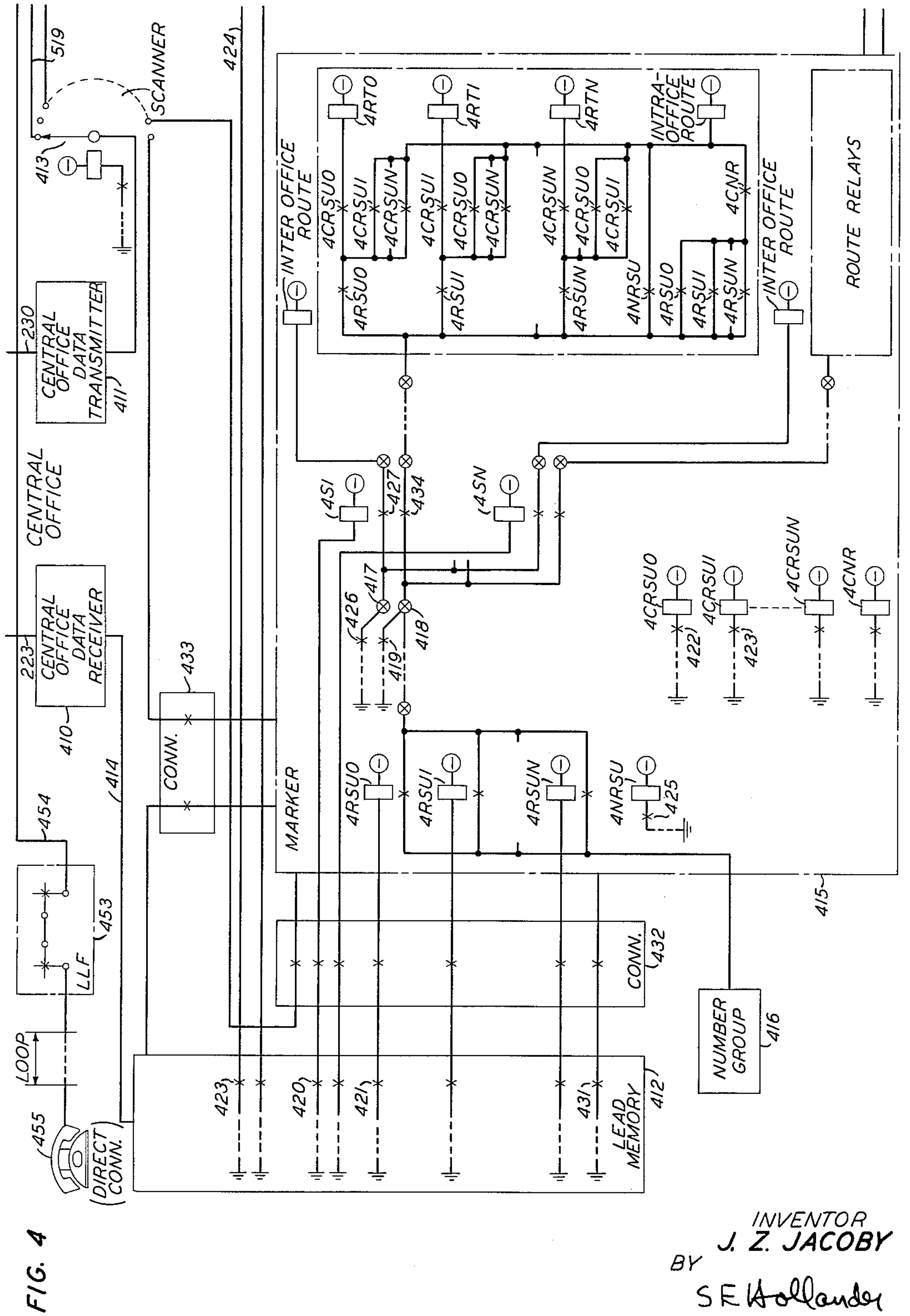
FIG. 4 shows portions of the marker circuitry.

At the outset, the marker examines the first three or office code digits to determine the routing of the call as explained in detail herein. Since, as illustrated in FIG. 1, calling substation 210 and called substation 211 are connected to the same remote unit RSU0 an intraunit call is in effect. Additional equipment in the marker shown in detail in FIG. 4 is utilized to determine that the call is, in fact, an intraunit call. Ultimately a route relay in the marker representative of an intraunit call is energized and governs the particular channel to be employed in completing the connection. In the present illustration, the marker will proceed to establish an intraunit trunk connection by selecting an intraunit trunk in the remote unit of which trunk 216 is representative. Thereafter, the appropriate horizontal and vertical magnets in the crossbar switches are operated to connect the "B" appearance of the intraunit trunk to the called line and the "A" appearance of the intraunit trunk 216 to the calling line 210 over line link frame 212 and 213 and trunk link frame 215. After the connection has been established, the marker releases itself and energizes ringing selection switch 317 to supply the appropriate ringing to the called line 211.

Intraunit trunk 216 now governs the ringing and supervision of the call in a manner similar to that performed by a conventional intraoffice trunk for an intraoffice call, as described, for example, in the Busch patent.

When the conversation is completed and substations 210 and 211 are returned to the on-hook condition, the connection is released in the conventional manner, although without control directions from the office.

The relationship of the remote unit circuitry in FIG. 1 may be viewed in contrast to the conventional direct connected substations represented symbolically by substation 455 which is directly connected to the line link frame 453 at the central office in the manner described in the Busch patent. A group of "local" junctors 454 connect the local line link frame 453 to the trunk link frame 512.

DETAILED DESCRIPTION OF MAJOR COMPONENTS

FIG. 2 shows a group of substations 210 and 211 which are illustrative of a substantially larger number of substations, not shown. Substations 210 and 211 are connected over conventional loop circuitry to the vertical conductive paths of line link frames 212 and 213, respectively. Trunk link frame 215 is shown as connectable to the line link frames 212 and 213 in a conventional manner described in the above-referred-to Busch patent and modified to connect some line link frame junctors to the extended junctors. Intraunit trunk 216 which is representative of a plurality of such trunks is adapted to provide a connection between the tip, ring, and sleeve conductors T, R, and S, of various trunk circuits to effect a speech connection therebetween in the manner described in the Busch patent for an intraoffice trunk circuit. The control circuitry in the trunk circuit is shown symbolically by contacts 241 which may be operated to interconnect the "A" and "B" appearances. Connectors 217 and 218 and their counterpart connectors 432 and 433 in the central office afford control access to the line link frames and the trunk link frame, respectively, in the conventional manner and may illustratively include multicontact relays to open or close the numerous control connections extending to the line link and trunk link frames.

In view of the remote disposition of the equipment shown in FIGS. 2 and 3, the connectors 217 and 218 are not directly connectable to the marker circuitry in the central office as in the conventional manner but instead must transmit and receive information through the data control system which includes the remote data transmitter 219, data receiver 410, transmitter 411, and receiver 220.

Scanner 221 at the remote unit, shown symbolically as a stepping switch, periodically samples each of the conventional control conductors extending to the line link and trunk link frames for supervisory conditions thereon. In each instance the information appearing on the control conductors is extended over conductor 222 to the remote data transmitter 219 which in turn, over channel 223, transmits the information to the data receiver 410 at the central office. The latter device is capable (illustratively) of receiving information at relatively high rates of speed. Buffer circuitry in the form of lead memory 412 is therefore included at the output of the data receiver 410 to store the signals received at a relatively high rate and to operate conventional electromechanical contacts to reflect this information.

Extending from the lead memory 412 is a full set of control conductors identically corresponding to those being scanned by scanner 221 at the remote unit. The lead memory 412 applies a condition to each of these conductors identical to the condition existing on the corresponding conductor at the remote unit. As a result the distance between the remote unit and the central office is "bridged" by the data transmission system and the lead memory. In consequence, the conductors extending to the marker 415 through connector 432 for the line link frame and connector 433 for the trunk link frame and other common control equipment in the central office, experience control indications thereon which would be identical to those that would have been received if the equipment were, in fact, directly connected to the marker 415 at the central office.

It follows that the same problem with respect to transmission of information between the remote unit and the central office exists for control or supervisory indications emanating from the common control equipment at the central office and directed to the remote frame equipment. For this purpose scanner 413, data transmitter 411, receiver 220, and lead memory 224 serve an identical purpose to that discussed for the data transmission in the direction from the remote unit to the central office. Thus, scanner 413, shown symbolically as a stepping switch, examines all of the appropriate conductors extending from the common circuitry and delivers indications of the supervisory condition thereon, e.g., ground or negative battery to data transmitter 411 which forwards this information to data receiver 220 and lead memory 224. It will be noted that the buffer circuitry in lead memory 224 may illustratively include ferreeds of the type described in an article entitled "The Ferreed—A New Switching Device," vol. 39, Bell System Technical Journal, January 1960, page 1.

The marker circuitry of FIG. 4 includes the appropriate class of service and routing relays for determining the identity of an intraremote unit call as will be explained in detail herein.

It is seen from the above that FIGS. 2 and 4 show in large measure the control connections between the remote unit and the central office as adverted to above. The speech connections or conversation paths between the remote unit and the central office are included in FIGS. 3 and 5 which show appropriate central office extended junctor circuitry 510 and remote unit extended junctor circuitry 310.

As will be seen from the discussion herein, these extended junctor circuits are designed to stretch or extend the conventional junctor circuits which ordinarily appear between the line link frame and the trunk link frame. For example, junctor 226 from line link frame 212 extends to the T1, R1, and S1 conductors of extended junctor circuit 310, and through repeater amplifier 311, conductors 312 and 313 to repeater 511 in extended junctor circuit 510 at the central office. The tip, ring, and sleeve conductors T1, R1, and S1 of extended junctor circuit 510 extend to conventional trunk link frame 512 which in turn is connectable to originating registers, intraoffice trunks, incoming trunks and outgoing trunks in the usual manner.

Viewed overall, the function of extended junctor circuitry 310 and 510 is to bridge the distance between the remote unit and the central office with respect to speech transmission, dial pulsing, etc., in a manner which simulates to trunk link frame 512 that line link frame 212 is directly connected thereto. In short, the extended junctor circuitry is designed to connect to trunk link frame 512 in a manner such that the latter is unaware that line link frame 212 is not physically located in the same office as in the conventional arrangement.

A similar path may be traced for the extended junctor circuitry available to line link frame 213 over conductor 225, junctor circuit 314, conductors 315 and 316, and central office junctor circuit 513 to trunk link frame 512. It is seen that the extended junctor circuitry performs a function with regard to the speech or conversation paths that the data transmission system performs with respect to the majority of control communications, i.e., bridging the gap between the remote unit and the central office.

The path for communications between the remote substation and central office may be contrasted with that for substation 455 which is shown as directly connected to line link frame 453 in the conventional manner. Access is then available to trunk link frame 512 over a group of junctors 454 under control of the marker as explained in detail in the above referred to Busch patent.

It will be seen in FIGS. 3 and 5 that the extended junctor circuitry includes sleeve signaling relays 5S1 and 5S2 at the central office and 3S3 and 3S4 at the remote unit. Relay 5S1 is equipped with an upper and lower winding as is relay 3S3. A ground condition on conductor S1 at the central office will result in the operation of relay 5S1 over the upper winding in view of the unbalanced condition applied to the differential windings. In this respect, relay 5S1 is designed to remain unoperated when contacts of relay 5S2 are closed and no ground condition is applied to conductor S1 in view of the differentially wound and opposing upper and lower windings.

Operation of relay 5S1 over the upper winding causes the application of ground condition over conductor 519 to scanner 413. In its periodic examination of the terminal connected to conductor 519, the information on conductor 519 is delivered to the data transmitter 411 and ultimately received in data receiver 220 over channel 230. Buffer memory store 224 receives the information from data receiver 220 and a ground condition corresponding to that which appeared on conductor 519 is caused by the lead memory to be applied to conductor 229 as shown symbolically by the operation of contact 228. As a result, relay 3S4 is operated over an obvious path and the contacts of relay 3S4 in series with the lower winding of relay 3S3 are operated. Since the upper and lower windings are differentially opposed and balanced, relay 3S3 does not operate although in view of the impedances of the upper and lower windings, as explained in detail herein, a potential approaching ground is applied to conductor S1 and may be traced over conductor 226 to the sleeve of the line link frame.

A similar analysis may be made for a transfer of sleeve potential supervisory indications in the direction from remote switching unit 212 to the trunk link frame 512 in the central office.

DETAILED DESCRIPTION OF OPERATION

*Dialing connection*

It will be assumed for purposes of illustration that a subscriber at substation 210 is seeking to effect a connection to a subscriber connected to the same remote unit at substation 211. When substation 210 goes off hook, a line relay in the line link frame, not shown, is operated which causes the line link frame to energize conductor 227. Scanner 221 in its periodic examination of the terminal to which conductor 227 is connected transmits an indication representative of the energized condition of conductor 227 over transmitter 219, channel 223, receiver 410 and conductor 414 to energize an appropriate group of contacts in the lead memory which extends a corresponding energized condition to a conductor coupled to a connector. The latter is conventional equipment shown symbolically by connectors 432 and 433 and described in detail in the above-referred-to Busch patent. In a conventional manner a marker is selected, for example marker 415. At this time numerous other conductors similar to conductor 227 in the line link frame are energized through connector 217 to transmit to the marker the identity of the calling line.

The marker then proceeds to extend a connection from the calling substation to an idle originating register, for example register 514 by determining its availability through connector 551. In doing so the marker determines the class of service from the vertical file on which the calling line appears in the conventional manner and also determines the equipment location of the calling line on the line link frame in the conventional manner. All of this information is transmitted in due course over channel 223 and the lead memory 412 to energize the appropriate conductors extending to the marker circuit. This is shown symbolically by the operation of contacts 431 in lead memory 412.

The marker then proceeds to select an idle channel between the subscriber line and originating register 514. It will be assumed that this channel includes conductor 226, extended junctor circuit 310, conductors 312 and 313, and extended junctor circuit 510 to conductors T1, R1, and S1 extending to trunk link frame 512 and originating register 514. Having established the availability of a channel, the marker operates the necessary select (horizontal) and hold (vertical) magnets required to close through the channel by delivering the appropriate information over channel 230, date receiver 220, lead memory 224, connector 217 and conductor 233.

At this time the subscriber is connected to the originating register 514 over the path traced above. The register furnishes dial tone and is prepared to receive the dialed digits.

Since it has been assumed that station 211 is to be called, the originating register 514 will receive and store the digits corresponding to the directory number of called station 211. Ater register 514 receives the necessary information it engages a marker circuit in the conventional manner via originating register marker connector 552 and transmits the appropriate information to the marker. The operation of the extended junctor circuitry including the transmission of dialing information is examined in detail infra.

*Operation of extended junctor circuitry*

Referring now to FIGS. 3 and 5, extended junctor circuitry incorporating the sleeve transmission signaling system is shown. In essence, the function of the extended junctor circuitry in the remote unit and the central office is literally what the term implies, that is, to "stretch" the conventional junctor which exists between the line link frame and the trunk link frame. In doing so, two distinct functions must be performed. The first is to repeat speech or voice transmission and this is done in a straightforward manner over repeater amplifiers 311 in the remote unit and 511 in the central office. The second essential function is to transmit those signals which are conventionally delivered over the completed speech path, such as dialing information, repeating of tip party ground, etc.

In addition, the extended junctor circuitry in conjunction with the data transmission system is utilized to transmit sleeve supervisory indications. As shown in FIG. 3, the tip, ring, and sleeve T1, R1, and S1 of the remote unit are connected over conductor 226 to line link frame 212. When the appropriate select and vertical magnets are energized to couple line link frame 212 to the extended junctor circuit 310, a path may be traced for repeating of dial pulses and on- off-hook information which includes relay 3A in the remote unit and relay 5A1 in the central office. Thus, closure of the loop, including T1 and R1, by the dial pulsing contacts (not shown) at the substation results in the operation of relay 3A, the dial pulsing relay, over a path including conductor T1, contacts of relay 3RC, winding 322, winding of relay 3TG, winding of relay 3A to negative battery. The remaining portion of the path may be traced from ground, winding of relay 3A, winding of relay 3TG, winding 323, contacts of relay 3RC to conductor R1. Relay 3TG does not operate at this time since it is designed as a differentially wound relay although relay 3A does operate.

Operation of relay 3A results in the application of +130 volt potential from source 324 over the contacts of relay 3A, resistance 318, winding 320, repeater 311, conductor 313, repeater 511, winding 516, winding of relay 5TG1, winding of relay 5A1 to negative battery. Since relay 5TG1 is marginally operative, it does not operate in view of resistance 318 although relay 5A1 does operate. Operation of the latter relay results in the closure of the loop circuit to the trunk link frame 512 over conductors T1 and R1 in FIG. 5 as a result of the operation of the contacts of relay 5A1. In this manner the alternate opening and closure of the dial pulsing contacts in the substation are repeated over the line loop and through the extended junctor circuitry to the central office.

An additional significant aspect of the control circuitry in the extended junctor is to transmit tip party ground indications. The tip party ground indication is used conventionally to establish the identification of the tip party and to distinguish the tip party from the ring party on a two-party line. The basis of the distinction resides in the application of a resistance ground to the tip side of the line by the switchhook contacts in closing the loop. Relay 3TG at the remote unit includes two windings wound in opposing directions in order to provide balancing ampere turns as a result of the closure of the switchhook contacts. Thus, relay 3TG does not operate unless a resistance ground appears on the tip side of the customer loop. If a tip party subscriber is initiating a call, the operation of relay 3TG over the path described above for the operation of relay 3A results in the shunting of resistance 318. As a result, source 324 supplies a higher current over the contacts of relays 3A, 3TG, winding 320, repeater 311, conductor 313, repeater 511, winding 516, winding of relay 5TG1, and the winding of relay 5A1 to negative battery. This higher current is sufficient to operate marginal relay 5TG1. The latter relay is designed as a slow-release relay to preclude it from following dial pulses. Operation of relay 5TG1 extends a ground condition over resistance 521, contacts of relay 5TG1, and winding 522 to tip conductor T1 extending to trunk link frame 512 thereby forwarding the original tip party ground from the substation to the trunk link frame.

In order to transmit sleeve supervisory indications from the remote unit to the central office and vice versa, relays 5S1 and 5S2 at the central office are used in conjunction with relays 3S3 and 3S4 at the remote unit.

For illustrative purposes, it will initially be assumed that a terminating call is in effect to remote substation 210. If extended junctor circuit 510 is selected as a portion of the channel, a ground condition will be applied from the trunk link frame 512 which will appear on conductor S1 to unbalance the differentially wound coils of relay 5S1. Ordinarily, when relay 5S2 is operated, the windings of the two coils are such that they will produce substantially opposing ampere turns and that, as a result, serial current from source 523 through the upper and lower windings to ground will not result in the operation of the relay.

However, in view of the unbalance condition applied to relay 5S1, the relay operates over winding 1–2 and results in the application of a ground potential to conductor 519. In its periodic examination of conductor 519, the scanner transmits the supervisory indication appearing thereon through the data transmission system including channel 230 to lead memory 224 in the remote unit. As indicated above, lead memory 224 includes appropriate buffer facilities for converting the high speed signals from receiver 220 to supervisory indications corresponding to those existing in the central office. Thus, lead memory 224 applies a ground potential as shown symbolically by the operation of contacts 228 to conductor 229 thereby operating relay 3S4 in the remote unit. Operation of the latter relay results in the application of a ground potential to the lower winding of relay 3S3. As discussed above, this energization of relay 3S3 produces a balanced condition between the ampere turns of the upper and lower windings as a result of which the relay does not operate. However, the ground condition applied through the contact of relay 3S4 is extended through the lower winding to conductor S1 which extends over cable 226 to the sleeve conductor of the line link frame. Thus, the original ground in the central office from the sleeve conductor of the trunk link frame has been extended to the remote unit to energize the remote unit sleeve conductor in the same manner in which the conductor would have been energized if, in fact, a metallic connection existed between the line link frame and trunk link frame as is the case conventionally.

An analogous operation may be traced in the event that its sleeve supervisory indication is to be transmitted from the remote unit to the central office. In the event that sleeve ground has been applied at the remote unit line link frame 212, the ground condition applied to the sleeve conductor may be traced over conductor 226, conductor S1 to relay 3S3. As explained above, this produces an unbalanced condition between the windings resulting in the operation of relay 3S3. The contacts of relay 3S3 apply a ground condition to conductor 319 which is detected by scanner 221 and forwarded over conductor 222 to remote data transmitter 219, channel 223, data receiver 410 and conductor 414 to lead memory 412 in the central office. In the lead memory 412 a ground condition is applied to conductor 424 as shown symbolically by the operation of contacts 423 to operate relay 5S2 in the central office. The operation of relay 5S2 places a ground potential on the lower winding of relay 5S1 which, however, produces a balanced condition of the ampere turns in the windings to preclude relay 5S1 from operating. Nevertheless the ground condition over the contacts of relay 5S2 is forwarded through the lower winding to conductor S1 extending to the trunk link frame 512. In this manner the sleeve supervisory indication originating at the remote unit has been transmitted to effectuate a corresponding indication at the central office.

It will be noted that in the direction of transmission from the remote unit to the central office, the remote unit relay 3S3 was operated while the central office relay 5S1 was "transparent" to the indication by not operating. Conversely, in the direction of transmission from the central office to the remote unit, the central office sleeve relay 5S1 operated while the remote unit relay 3S3 remained "transparent" or passive. In this manner bidirectional signaling, using the differentially wound relays, is available despite the lack of a permanent physical connection between the supervisory relays.

One of the necessary criteria for successful operation of the sleeve signaling circuit is the ability of the relay signaling arrangement to function as described hereinabove despite variations in the source impedance of the potentials which are connected to the sleeve during the process of setting up a connection. These source impedances may range from 1570Ω to 695Ω in a typical situation in a crossbar office. To illustrate the primary requirement on relay 3S3 or 5S1 reference may be made to FIG. 7.

If the ampere-turns of upper winding $N_1$ and lower winding $N_2$ are to balance, or cancel each other so that the net ampere-turns NI will be less than $|NI_0|$ (the minimum ampere-turns required to operate the relay) the following relation must be satisfied for $R_B$ ranging in value from 1570 to 695Ω (typical values in a No. 5 crossbar office for sleeve battery source impedance)

$$N_1I_1 - N_2I_2 < |NI_0| \quad (1)$$

Both $I_1$ and $I_2$ may be evaluated in terms of $R_1$ (upper winding resistance), $R_2$ (lower winding resistance), $R_B$ and V.

$$I_2 = \frac{V}{\frac{R_1R_B}{R_1+R_B}+R_2} \quad (2)$$

$$I_1 = \frac{I_2R_B}{R_1+R_B} = \frac{VR_B}{\left(\frac{R_1R_B}{R_1+R_B}+R_2\right)(R_1+R_B)} \quad (3)$$

Hence, rewriting Equation 1:

$$\frac{V}{\left(\frac{R_1R_B}{R_1+R_B}+R_2\right)}\left[\frac{N_1R_B}{R_1+R_B}-N_2\right]<|NI_0| \tag{4}$$

In satisfying this relationship for relay 3S3 the parameters may take the following illustrative values:

$R_1=1000\Omega$, $N_1=2000$ (upper winding turns)
$R_2=110\Omega$, $N_2=1000$ (lower winding turns)
$V=48$ volts
$R_B=1570$ or $785\Omega$ (depending upon the resistance of the hold magnets connected to the sleeve)

Equation 4 may then be solved for both values of $R_B$.

$R_B=1570\Omega$:

$$\frac{48}{\left(\frac{10^3\times 1570}{2570}+110\right)}\left[\frac{2000\times 1570}{2570}-1000\right]<|NI_0|14.5<|NI_0|$$

$R_B=785\Omega$:

$$\frac{48}{\left(\frac{10^3\times 785}{1785}+110\right)}\left[\frac{2000\times 785}{1785}-1000\right]<|NI_0|10.5<|NI_0|$$

Hence, if $|NI_0|>$ e.g. 20 ampere-turns, relay 3S3 will meet the necessary criteria for successful operation of the sleeve relay located in the junctor circuit 310 at the remote unit. A similar anaylsis may be used to determine $|NI_0|$ for relay 5S1 at the central office. Typical parameter values which may be illustratively used for this relay are:

$R_1=5000\Omega$, $N_1=5000$
$R_2=29\Omega$, $N_2=800$
$V=48$ volts
$R_B=1570$ or $695\Omega$ Then equation 4 may be solved for both values of $R_B$.

$$\frac{48}{\left(\frac{5\times 10^3\times 1570}{6570}+29\right)}\left[\frac{5000\times 1570}{6570}-800\right]<|NI^0|15.4<|NI_0|$$

$R_B=695\Omega$:

$$\frac{48}{\left(\frac{5\times 10^3\times 695}{5695}+29\right)}\left[\frac{5000\times 695}{5695}-800\right]<|NI_0|14.2<|NI_0|$$

Hence, if $|NI_0|>20$ ampere-turns for relay 5S1, the relationship conforms to the criteria referred to above.

Other aspects of the extended junctor circuitry include customer ringing set up over the data transmission system and provided from the local ringing supply 329 at the remote switching unit. However, ringing must also be set up at the central office end of the junctor so that a ringing start signal and audible ringing may be generated. Ringing start signals are transmitted over the data transmission system and result in the operation of relay 3RS as shown symbolically by the operation of contacts 231 in the lead memory to apply ground condition to conductor 232. The initiation of this action at the central office may proceed in various ways including the extension of contacts of relay 5R to a terminal scanner 413.

Relay 5R operates as a result of the application of ringing potential to conductors T1 and R1 in consequence of which a path may be traced over capacitor 535 and diodes 531–534 or 532–533 depending on the polarity of the ringing signal to the contacts of relay 5A1 and the ring conductor R1. Operation of relay 5R results in the shunting of resistance 536 and the application of negative battery over the contacts of relay 5R and the contacts of relay 5S1, winding 537, conductor 312, winding 331, winding of relay 3R1 to negative battery. Operation of relay 3R1 initiates the operation of relay 3RC from ground, contacts of relay 3R1, 3RS and 3TR.

Operation of relay 3RC results in the extension of ringing current from ringing switch 317 over the upper and lower windings of relay 3TR, contacts of relay 3RC to the tip and ring conductors T1 and R1.

Ringback is also repeated in the present arrangement in those instances where an operator in setting up a delayed toll call, sets up a call to the calling substation line and having established the connection to the called substation seeks to initiate ringing to the calling substation. In this instance the operator determines when ringing is to be applied in lieu of the marker circuit as in conventional operation.

Application of ringing potential to the tip and ring conductors T1 and R1 in the central office in the conventional manner results in the operation of relay 5R as described above. Relay 5R causes the operation of relay 3R1 which will cause 2OR ringing to be applied across the tip and ring if relay 3RS is in the nonoperated condition.

In this instance ringing is not tripped by trip relay 3TR, instead the operator must cease ringing when the called party answers. This arrangement will permit the operator to ring a line even if the subset is off hook.

It is manifest that in an intraunit call repetition of ringing is not required and that the intraunit trunk may autonomously control ringing in a conventional manner as an intraoffice trunk would on an intraoffice call.

*Establishing intraunit connection*

Returning to the completion of the call, after the marker receives the appropriate information from the originating register 514 it proceeds to effectuate a connection between the calling and called substations.

The initial procedure by the marker is to translate the office code to determine the destination of the call. Equipment in the marker circuitry, a portion of which is shown in FIG. 4, examines the first three or office code digits to determine the routing of the call and places a marking potential on a particular code point in an array of code points shown symbolically by code points 417 and 418. Since it has been assumed that calling substation 210 and called substation 211 are connected to the same remote unit, an intraunit call is in effect. As a result equipment in the marker, shown symbolically by contacts 419, places a reference potential on code point 418. Prior thereto class-of-service relay 4S1 has been operated conventionally by information transmitted from the remote unit over the data transmission system to lead memory 412. Appropriate memory equipment in lead memory 412, shown symbolically by contacts 420, results in the operation of relay 4S1 as representative of the class of service of the called substation. As a result, a path may be traced over the contacts 421 of relay 4S1 up to the contacts of relay 4RSU0. Also prior thereto, relay 4RSU0 which indicates the particular line link frame to which the calling substation is connected has been operated also from information transmitted from the remote unit. Illustratively this is shown by the operation of contacts 421 to energize relay 4RSU0. Thus, relay 4RSU0 is common to each of the line link frames for a particular remote switching unit, in this case remote switching unit 0.

At this time an additional path may be traced from ground, contacts 419, code point 418, over the contacts of relay 4RSU0 to number group 416. Seizure of the number group in this manner affords an identification of the equipment location of the called line in the conventional manner described in the above-referred-to patent. Since it has been assumed that an intraremote unit call is in effect, energization of the number group circuit 416 results in the operation of relay 4CRSU0 which represents that the called line link frame is in remote switching unit 0. This operation is shown symbolically by switch 422. Thereafter, a further circuit may be traced from code point 418, contacts 434 of class-of-service relay 4S1, contacts of relays 4RSU0, 4CRSU0, to relay 4RT0 to energize that relay. Relay 4RT0 is representative of the routing relay in the marker circuit which selects the particular channel to be employed in completing the connection. Under the given conditions the marker proceeds to establish an intraunit trunk connection governed by route relay 4RT0 by selecting an intraunit trunk of which trunk 216 is representative and connecting first the "B" appearance of the intraunit trunk to the called line and then the "A" appearance of the intraunit trunk to the calling line by closing the appropriate horizontal and vertical magnets over the data transmission circuit.

After the originating connection has been set up between the calling line link frame 212 and the "A" appearance of the intraunit trunk on the trunk link frame 215, the marker releases itself from the intraunit connection after setting the ringing selection switch 317 to supply the appropriate ringing to the called line.

The intraunit trunk now controls the ringing and supervision of the call in a manner similar to that performed by an intraoffice trunk for an intraoffice call. The conventional control equipment in the intraunit trunk for performing these and other functions is shown symbolically by contacts 241. Ringing is "tripped" when the called party answers and the ringing selection switch 317 is released conventionally.

When the conversation is completed and substations 210 and 211 are returned to the on-hook condition the intraunit trunk functions in a manner similar to a central office intraoffice trunks as explained in detail in the Busch patent in releasing the calling and called connections but, in this case, autonomously, and at a substantial distance from the office.

*Call from remote unit RSU0 to remote unit RSU1*

In the event that a connection is to be completed between two distinct remote units, an intraunit trunk cannot be used to complete the call and instead the connection must be forwarded over separate extended junctor circuits leading from the central office to both remote switching units.

Examining the routing circuitry in FIG. 4 for a call between remote unit RSU0 and RSU1, it will be seen that relay 4RSU0 will operate to indicate that the calling line link frame is in remote switching unit RSU0 in the manner indicated above. However, in examining the called line equipment location in the number group circuit, the marker will determine that the called line link frame is in remote switching unit 1 and as a result causes the energization of relay 4CRSU1 as shown symbolically by the operation of switch 423. Thus, a path may be traced from ground, switch 419 operated in the manner indicated above, code point 418, contacts 434 of relay 4S1 also operated in the manner indicated above, contacts of relay 4RSU0, relay 4CRSU1 to the intraoffice route relay. Having established this information, the marker proceeds to effectuate an intraoffice trunk connection utilizing trunk link frame 512, intraoffice trunk 520 and separate extended junctor circuits to remote switching unit 0 and remote switching unit 1 of which only the former is shown in FIG. 2.

A similar pattern would exist if a call was initiated from a remote unit to a line connected directly to the main central office, for example, line 455. Under these conditions relay 4CNR would be operated as a result of the number group determination as indicative of a called line which is not remote but instead is connected directly to the central office. Investigation of the routing circuitry will show that if the call had originated at remote switching unit 0 for a line in the central office, a path may be traced over switch 419, code point 418, contacts 434, contacts of relay 4RSU0, contacts of relay 4CNR to the intraoffice route relay which would initiate the intraoffice trunk connection adverted to above.

An analogous operation would occur if a call were undertaken from a line connected directly to the central office, for example, line 455 to a line connected to the remote unit RSU0. Under thesse conditions relay 4NRSU would be operated to indicate that the calling line link frame is located in the central office as shown symbolically by the operation of switch 425. A path may be traced in this instance from ground, switch 419, code point 418, contacts 434 and contacts of relay 4NRSU, to the intraoffice route relay to initiate an intraoffice trunk connection.

In the event that a call is intended to extend from a remote switching unit to a different office, this situation is shown in FIG. 4 symbolically by the operation of switch 426 to apply a ground condition to code point 417 and over the contacts 427 of class-of-service relay 4S1 to operate the appropriate interoffice route relay to initiate the connection to a distant office in the conventional manner detailed in the above-refrred-to patent of A. J. Busch.

It is understood that the above embodiments are merely illustrative and that various modifications may be made without departing from the spirit and scope of the invention.

What is claimed is:

1. An automatic telephone switching system including a plurality of remote substation lines, a plurality of remote switching units, a telephone central office, means for governing said remote switching units under control of said office to connect said lines to said office and to each other, signaling means at said remote units and at said central office including bidirectional signaling devices, means at said central office responsive to the transmission of signal information from said central office to said remote unit through said signaling devices for operating said signaling device at said central office and for precluding the operation of said signaling device at said remote unit, and means at said remote unit responsive to the transmission of signal information from said remote unit to said central office for operating said signaling device at said remote unit and precluding the operation of said signaling device at said central office.

2. A distributed telephone switching system including a telephone central office, a plurality of remote substations, a plurality of remote switching units for connecting said lines to said office and interconnecting said lines under control of said office, bidirectional signaling means at said remote units and at said central office, said signaling means including relay means, output means connected to said relay means, a common transmission channel means for coupling said relay means at said remote switching units to said relay means at said central office over said transmission channel, means at said central office responsive to the transmission of a particular supervisory condition from said central office to one of said remote switching units to operate said relay means at said central office and to preclude the operation of said relay means at said one remote switching unit, and means at said one remote unit for applying a supervisory indication to said output means at said remote unit corresponding to said particular supervisory condition at said central office.

3. A distributed telephone switching system in accordance with claim 2 including in addition means at said one remote switching units responsive to the transmission of information representative of a particular supervisory indication from said one remote unit to said central office for operating said relay means at said remote unit and for precluding the operation of said relay means at said central office, and means at said central office for applying a signal condition to said output means corresponding to said supervisory indication at said remote switching unit.

4. A bidirectional signaling system for transmitting signal information between distant units and a telephone central office including signaling means at said remote units and signaling means at said central office, output means connected to both said signaling means, means at one of said remote units responsive to the transmission of a signal indication to said central office through said signaling means for operating said signaling means at said remote unit and precluding the operation of said signaling means at said central office, and means at said central office for applying a signal condition to said output means representative of said signal indication.

5. A bidirectional relay signaling system for transmitting signal information between distant units and a telephone central office including signaling means at said remote units and signaling means at said central office, said signaling means including relays having serially connected differential windings, signaling terminals connected to the midpoint of said windings, means for applying a supervisory condition to said terminal of said relay at a remote unit to operate said relay, and means effective upon the operation of said one relay for providing a corresponding supervisory condition on said terminal of said relay at said central office without operating said relay.

6. A telephone signaling system for transmitting signal information between a distant unit and a telephone central office over a time division channel including signaling means at said remote unit and signaling means at said central office, said signaling means including a relay having serially connected differential windings, terminals connected to the midpoint of said windings, switching means connected in series with one of said windings and said signaling terminal, means for applying a signal condition to said terminal at said remote unit indicative of a telephone supervisory indication for operating said relay at said remote unit, and means responsive to the operation of said relay for energizing said switching means connected to said winding at said central office to apply a signal condition to said terminal of said relay at said office corresponding to the signal applied to said remote unit terminal.

7. A bidirectional signaling system for transmitting signal information between a distant unit and a telephone central office over a time division channel including remote signaling means and central office signaling means, said signaling means including a first relay having serially connected differential windings, a second relay, signaling terminals connected to the midpoint of said windings, switching means governed by said second relay serially connected with one of said windings and said signaling terminal, means for applying a signal condition to said signaling terminal at said central office for operating said first relay at said central office, and means responsive to the operation of said first relay for energizing said second relay at said remote unit and precluding the operation of said first relay at said remote unit to provide a signal condition on said signal terminal at said remote unit corresponding to said applied signal condition.

8. An automatic distributed telephone switching system including a plurality of remote substation lines, a plurality of remote switching units for interconnecting said lines under control of said central office, a plurality of extended junctor circuits for coupling said remote switching units to said office, signaling means at said remote units and at said central office including bidirectional signaling devices, means at said central office responsive to the transmission of signal information through said devices for operating said signaling device at said central office and precluding the operation of said signaling device at said remote unit, means at said remote unit responsive to the transmission of signal information from said remote unit to said office for operating said signaling device at said remote unit and precluding the operation of said device at said office, dial pulse repeating means at said remote unit and at said central office, said dial pulse repeating means being operative in response to the reception of dial pulses from one of said substations to transmit said pulses over said extended junctor circuit to said central office pulse repeating means.

9. A distributed telephone switching system including a telephone central office, a plurality of remote substations, a plurality of remote switching units for interconnecting said substations under control of said office, a plurality of extended junctor circuits for coupling said remote switching units to said office, bidirectional signaling means at said remote units and at said central office, said signaling means including a relay having serially connected differential windings, a signaling terminal connected to the mid-point of said windings, switching means connected in series with one of said windings and said signaling terminal, means responsive to the connection of a terminating call to one of said substations for applying a supervisory condition representative thereof to said terminal in said central office, to operate said relay in said central office and means responsive to the operation of said relay at said central office for energizing said switching means at said remote unit to preclude the operation of said relay at said remote unit and apply a signal condition to said terminal at said remote unit corresponding to the condition applied at said central office.

10. An automatic telephone switching system including a plurality of remote substation lines, a plurality of remote switching units, a telephone central office, a plurality of extended junctor circuits coupling said remote units to said office, means for governing said remote switching units under control of said office to connect said lines to said office and to each other, signaling means at said remote units and at said central office, said signaling means including relays having serially connected differential windings, signaling terminals connected to the midpoint of said windings, an auxiliary relay in said signaling means, contacts on said auxiliary relay connected serially with one of said windings and said signaling terminal, means responsive to a change in supervisory condition at one of said substations for applying a signal condition to said terminal at said remote unit to which said substation is connected to operate said signaling relay at said remote unit, means responsive to the operation of said relay for energizing said auxiliary relay at said central office to operate the contacts of said auxiliary relay and to preclude the operation of said signaling relay at said central office, and means responsive to the operation of said contacts for applying a signal condition to said terminal at said central office corresponding to the signal condition applied at said remote unit.

11. A distributed telephone switching system including a telephone central office, a plurality of substation lines, a plurality of remote switching units for interconnecting said lines under control of said office, a plurality of extended junctor circuits for coupling said remote switching units to said office, bidirectional signaling means in said remote units and said office, said signaling means including a relay having serially wound differential windings, a signal terminal connected to the midpoint of said windings, switching means connected serially with one of said windings, and said signal terminal, means for applying a signal condition to said signal terminal of said relay at said central office for energizing said switching means at said relay in said remote unit to provide a signal condition on said signal terminal of said relay corresponding to said applied signal condition, party identification signaling means connectable to said junctor circuit, said identification signaling means including party relay means, impedance means, contacts of said party relay means in shunt with said impedance means, said party identification signaling means being responsive to the origination of a calling condition by a particular party to operate said party relay and shunt said impedance over the contacts of said relay to transmit an identifying signal over said extended junctor circuit to said central office.

12. An automatic distributed telephone switching system including a plurality of substation lines, a telephone central office, a plurality of remote switching units, means for governing said remote switching units under control of said office to interconnect said lines, a plurality of extended junctor circuits for coupling said units to said office, bidirectional signaling means at said remote units and at said central office, said signaling means including a relay having serially connected differential windings, signaling terminals connected to the midpoint of said windings, auxiliary relay means in said signaling means having contacts connected serially with one of windings and said signaling terminal, means for applying a signal condition to said signaling terminal in said central office to operate said signal relay in said office, means responsive to the operation of said signal relay at said central office to operate said auxiliary relay at said remote unit and to close the contacts of said auxiliary relay connected to said winding of said signal relay in said remote unit, said signal relay being effective upon the closure of said contacts to extend a signal condition to the signaling terminal thereof corresponding to said applied signal condition in said office and to preclude the operation of said signal relay at said office, means at said central office for repeating ringing signals to a called substation at said remote unit over said extended junctor circuit including ringing detection relay means at said central office, unidirectional conducting means connected to said ringing detection relay, impedance means, switching means controlled by said detection relay means in shunt with said impedance means, said detection relay means being responsive to the application of ringing signals to operate said switching means and shunt said impedance means to deliver a signal indication to said remote unit over said extended junctor circuit representative of the operation of said ringing detection relay means.

13. An automatic distributed telephone switching system in accordance with calim 12 including in addition means responsive to the reception of said signal indication representative of the operation of said ringing detection relay means for controlling the application of ringing potential to said called substation.

14. An automatic distributed telephone switching system in accordance with claim 13 including in addition means responsive to an answer condition at said called substation for terminating the application of ringing signals to said substation.

15. A bidirectional relay signaling system for transmission of signaling information between a local unit and a remote unit including a relay at said local unit and a relay at said remote unit, said relays having serially connected differential windings, a first source of reference potential connected to a first of said windings, a second source of reference potential, switching means coupling said second source of reference potential to said second winding, a signaling terminal connected to the midpoint of said windings, means for applying a signal condition to said terminal of one of said relays for operating said one relay, and means responsive to the operation of said one relay for operating said switching means at said other relay to provide a signal condition on said signaling terminal of said other relay corresponding to said applied signal condition while precluding the operation of said other relay.

References Cited by the Examiner

UNITED STATES PATENTS

| | | | |
|---|---|---|---|
| 942,814 | 12/09 | Field | 178—57 |
| 2,770,678 | 11/56 | Flowers | 179—18 |
| 3,022,382 | 2/62 | Ewin | 179—18 |

OTHER REFERENCES

American Telegraphy and Encyclopedia of the Telegraph, William Maver, 1912, pp. 283–285.

ROBERT H. ROSE, *Primary Examiner.*

WALTER L. LYNDE, *Examiner.*